Patented Nov. 8, 1938

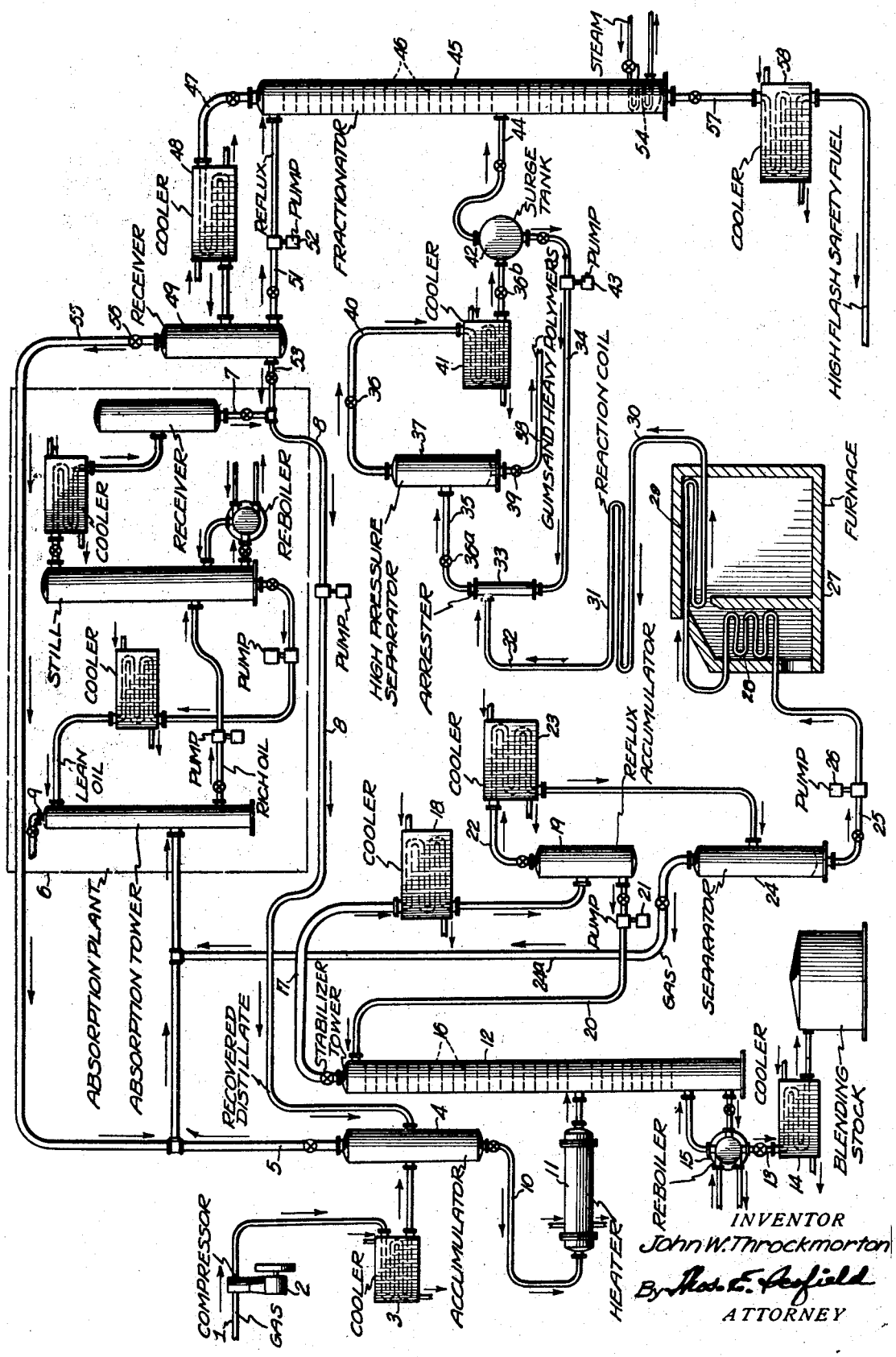

2,135,923

UNITED STATES PATENT OFFICE 2,135,923

METHOD AND APPARATUS OF PRODUCING A HIGH FLASH SAFETY FUEL

John W. Throckmorton, New York, N. Y., assignor, by mesne assignments, to The Pure Oil Company, Chicago, Ill., a corporation of Ohio Application October 27, 1933, Serial No. 695,429

9 Claims. (Cl. 196—10)

My invention relates to a process and apparatus for producing a safety fuel and more particularly to a process and apparatus for producing a high flash, high antiknock safety fuel suitable for aviation and marine use.

There is at present manufactured for use in air and marine engines a high flash safety fuel which does not have the tendency of ordinary gasoline to flash into flame or explode through accidental ignition. Experience in handling, storing and utilizing kerosene, cleaner's naphtha, etc. has shown that the danger from this source is negligible if the flash point is maintained above approximately 105° F. A high flash point may be had by close fractionation to raise the initial boiling point of the fuel. The ordinary natural and cracked products produce a fuel having an octane number below the practical limits of the Otto-cycle engine and a blend of such fuels with tetraethyl lead is frequently resorted to in order to increase their antiknock qualities.

A high flash, high octane number fuel is produced by hydrogenation which has the desired characteristics of a safety fuel and has the following specifications:

| | |
|---|---|
| A. P. I. gravity | 29.8 |
| I. B. P. (degrees F.) | 312 |
| E. P. (degrees F.) | 406 |
| Abel flash (degrees F.) | 106 |
| Copper dish gum (mg/100 c. c.) | 1.0 |
| Octane number | 80–90 |

This octane number has been determined against iso-octane and normal heptane blends on a Series 30 engine at 300° F. jacket temperature, 600 R. P. M. and 190–200# per square inch compression pressure. At the present time, there is no other known method of manufacturing this safety fuel except from a hydrogenated product.

One object of my invention is to provide a high flash safety fuel having high antiknock qualities.

Another object of my invention is to provide a high flash safety fuel by close fractionation of a condensate resulting from high temperature gas polymerization.

Another object of my invention is to provide a polymerization process in which gums and heavy polymers are removed from the polymerized distillate in an expeditious and novel manner.

Other and further objects will appear from the following description.

The accompanying drawing which forms part of the instant specification and which is to be read in conjunction therewith shows a schematic view of an apparatus capable of carrying out my invention.

In general, a gas containing a high percentage of unsaturates is compressed, cooled and charged to an accumulator where a separation of the gas and condensate of gasoline boiling range and light ends is made. The condensate passes to a stabilizer tower and the gas to an absorption plant where desirable constituents of substantially the accumulator condensate composition are recovered. These are combined with the condensate from the accumulator, heated and charged together to the stabilizer. The vapors and gases withdrawn overhead from the stabilizer are condensed and the condensate constitutes the reflux for the stabilizer gas and the charge to a polymerization unit. The uncondensed vapors and the incondensible gases are passed to the absorption plant. The reflux is condensed in a first separator and the charge to the polymerization unit is condensed in a second separator. The liquid charged to the polymerization furnace is there heated sufficiently to start polymerization. This reaction is then completed in a reaction coil by suitable pressure and temperature control. The material leaving the reaction coil is quenched instantly by the introduction of a light distillate and the liquid and vapors passed under pressure into a separator tower where the heavy polymers and gums are separated from the light distillate vapors and gas. The light distillate vapors and gas pass overhead from the evaporator; the pressure is reduced, after which they are cooled and passed into a surge tank. The gases, vapors and condensate are passed from the tank and are flashed into a fractionating tower. The high flash safety fuel is withdrawn from the bottom of the tower. The overhead vapors and gases are cooled and passed to a receiver. A portion of the condensate is returned to the fractionating tower as reflux and the remainder returned to the accumulator holding the charge to the stabilizer tower. The residual gases from the receiver passes overhead to the absorption plant and the recovered distillate is returned to the accumulator for charging to the stabilizer.

Referring now more particularly to the drawing, gases containing a high percentage of unsaturates which have been recovered for example, from the overhead vapors resulting from the fractionation of vapors from a cracking operation, are charged from a line 1 by a compressor 2 through a cooler 3 to a stabilizer charging accumulator 4. The uncondensed gases from the accumulator 4 pass through line 5 to an absorption plant 6 where desirable constitutents are recovered and returned to the accumulator 4 through the line 7 and line 8. The uncondensable gases from the absorption plant 6 pass off through the line 9.

The condensate in accumulator 4 which may be, for example, of a gasoline boiling range plus light ends, is charged through line 10, through a heater 11 into the stabilizer tower 12 from the bottom of which a blending stock is withdrawn through line 13 and cooled by passage through heat exchanger 14. The bottoms in the stabilizer tower 12 are continuously recycled through a reboiler 15 which supplies heat to the tower and insures vaporization of the light ends. The vapors evolved in the tower pass upward through trays 16 on which pools of condensate are formed. The uncondensed vapors from tower 12 pass off through line 17 through a cooler 18 where at least a part of the vapors are condensed. The mixture of liquid and vapors is introduced into the reflux accumulator 19 where the condensate accumulates and is fed back through line 20 having a pump 21 to the tower 12 to serve as reflux for controlling the temperature within the stabilizer. The uncondensed vapors from the accumulator 19 pass overhead through the line 22 having a cooler 23 where the vapors are further cooled and condensed before being introduced into a separator 24. The gases from the separator 24 pass off through line 24a to the absorption plant 6. The condensate formed in the separator 24 constitutes the charge to the polymerization furnace 27.

The condensate from the separator 24 is charged through line 25 having a pump 26 to a convection heating coil 28 of the furnace 27 where a preliminary heating of the charge takes place. The charge is further heated in a radiant heating section 29 of the furnace 27 and then passes through line 30 to a reaction coil 31 where the temperature increases slightly due to polymerization. The gases leaving the reaction coil 31 through line 32 enter an arrester 33 where they are admixed with a light distillate charged to the arrester through the line 34. The gases are thus instantaneously quenched and the mixture of gas, vapors and condensate is passed through the line 35 to a high pressure separator 37. Pressure is maintained thereon by means of valve 36. The pressure will hold the heavy polymers and gums in a liquid state so that they may be withdrawn from the separator through line 38 and passed to storage. A liquid level flow controller may be provided at the base of separator 37 to insure a constant liquid level therewithin, by the control of valve 39.

The light distillate vapors and gas pass overhead through the line 40, through cooler 41 to a tank 42, serving to collect the condensate formed, a portion of which is recycled by pump 43 located in line 34 back to the arrester 33. The cooler 41 does not reduce the temperature of the vapors to below a point which will permit the flashing of the lighter and undesirable constituents into vapors. The gases and both the condensed and uncondensed distillate from the quench oil separator 42 pass through line 44 to an intermediate point of the fractionating tower 45. If desired a heat exchanger may be used to heat the material passing into the tower 45. The gas and vapors pass upward through a series of bubble trays 46 on which pools of condensate are formed by suitable reflux control. The lightest vapors and the gas which is uncondensed in the tower pass off through line 47 and cooler 48 to a receiver 49 where the condensate already formed is collected. A portion of the condensate is returned through line 51 having a pump 52 to the fractionating tower 45. The remainder of the condensate is returned through the line 53 to the line 8 and thence to the stabilizer charging tank 4. The residual gases from the receiver 49 pass overhead through line 55 having a valve 56 to the absorption plant 6 from which the recovered distillate is passed through line 7 to the charging tank 4, as pointed out above. A thermostatically controlled steam coil 54 maintains the tower base at a temperature sufficient to obtain the flash on the safety fuel.

The condensate collecting in the base of the fractionating tower 45 is withdrawn through line 57, passes through a cooler 58 and forms the high flash safety fuel similar in boiling range characteristics to the average solvent naphtha made directly from crude except that it has a very high anti-knock rating.

The operation of the apparatus in carrying out my process is as follows. A gas rich in unsaturates is compressed by the pump 2 to a pressure of from 400 to 500 lbs. per square inch and subsequently cooled by heat exchanger 3 to a temperature of around 100° F. condensing a portion of the gas, the condensate being collected in accumulator 4. The uncondensed gas passes overhead to the absorption plant for the recovery of a distillate to be returned to the accumulator tank 4. The condensate from tank 4 is heated to a temperature of between 250° and 350° F. in heat exchanger 11 and charged to the stabilizer tower 12. The overhead from the stabilizer tower 12 is cooled by heat exchanger 18 to between 100 to 200° F. before being passed into the reflux drum 19 where reflux condensate is collected. The overhead vapors from the reflux drum are passed through heat exchanger 23 where the temperature is lowered to around 90° F. thus cooling the vapors and condensing a portion.

The gases and uncondensed vapors from separator 24 are passed through line 24a to the absorption plant 6. The condensate from separator 24 is heated in the polymerization furnace 27 to a temperature between 900 and 1000° F. and the pressure is maintained between 500 to 800 lbs. per sq. in. A further temperature rise occurs in the reaction coil 31 such that the gases leaving the reaction coil will be at about 950° to 1050° F. The temperature is almost instantly lowered in the arrester 33 to below 600° F. by the introduction of a light quench oil distillate. A pressure and temperature reduction is effected by the reducing valve 36a so that separator 37 is operated at a pressure above 200 lbs. per sq. in. and a temperature of 400° F. The heavy polymers, tars and gums are continuously removed from separator 37 and passed through line 38 through a cooler (not shown) to storage for further processing. A further pressure reduction may take place at 36 so that the vapors are condensed at about 200 lbs. per sq. in. The gas and light distillate in separator 37 are further cooled to 350° F. by passage through the heat exchanger 41 before delivery to the drum 42 which is maintained full. A further pressure reduction may be effected at 36b. A portion of this condensate is used for quenching. The gas, condensed and uncondensed distillate from the drum 42 are flashed into the fractionating tower 45 and subjected to fractionation. The uncondensed vapors leave the top of the tower at a temperature of about 200–250° F. and are subjected to condensation for reflux production and the uncondensed gases are passed to the absorption plant. The liquid condensate at the bottom of the tower 45 which is maintained at a temperature of about 325° F. is withdrawn and passed through the heat exchanger 58 to cool it and form the motor fuel of my invention.

It will be observed that I have accomplished the objects of my invention. I am enabled to produce by fractionation of a condensate resulting from high temperature gas polymerization a safety fuel having the specifications of a safety fuel formerly produced only by a hydrogenation process. I am enabled to remove tars and gums in an expeditious manner.

It will be understood that certain features, sub-combinations and operations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. The process of manufacturing a high flash, high anti-knock motor fuel from a gas rich in unsaturates which has been liquefied and subjected to exothermic polymerization under elevated temperatures and pressures suitable for converting said gas to hydrocarbons boiling within the gasoline boiling range which comprises the steps of commingling the hot products issuing from the polymerization zone with relatively cool liquefied light quench distillate in order to lower the temperature of said products below conversion temperature, but not below the vaporizing temperature of the gasoline boiling range constituents, passing the partially cooled products into a separating zone maintained under conditions of temperature and pressure sufficient to condense hydrocarbons boiling above the gasoline boiling range, but insufficient to condense any substantial quantity of gasoline boiling range hydrocarbons, withdrawing condensate from the separating zone separately from the gases and vapors and eliminating it from the system, cooling the remaining gases and vapors sufficiently to condense a portion of the vapors, returning condensed vapors to the quenching step, fractionating the remainder of the gases, vapors and condensate, and separating therefrom a condensate boiling within the gasoline boiling range.

2. Process in accordance with claim 1 in which the polymerization is carried out at temperatures between 900°–1050° F. and at pressures between 500 and 800 pounds per square inch, and the products issuing from the polymerization zone are quenched to a temperature below 600° F.

3. Process in accordance with claim 1 in which gas to be charged to the polymerization zone is mixed with residue gas from the polymerization zone, the commingled gas is contacted at super-atmospheric pressure with lean absorption oil, the gas undissolved in the oil is eliminated from the system, the dissolved gas is separated from the oil, the separated gas is fractionated into liquid and gaseous fractions, and the liquid fraction charged to the polymerization zone.

4. Process in accordance with claim 1 in which gas to be charged to the polymerization zone is mixed with residue gas from the polymerization zone, the commingled gas is contacted at super-atmospheric pressure with lean absorption oil, the gas undissolved in the oil is eliminated from the system, the dissolved gas is separated from the oil, the separated gas is fractionated into liquid and gaseous fractions, the liquid fraction is charged to the polymerization zone, and the gaseous fraction recirculated to the absorbing step.

5. Process in accordance with claim 1 in which the gas to be charged to the polymerization zone is compressed, fractionated and cooled to separate therefrom a liquid and a gaseous fraction, the gaseous fraction is commingled with residue gas from the polymerization zone, the commingled gases are contacted with lean absorption oil under super-atmospheric pressure, the gas undissolved in the oil is eliminated from the system, the dissolved gas is separated from the oil, the separated gas is fractionated into liquid and gaseous fractions, and the first and last mentioned liquid fractions are commingled and charged to the polymerization zone.

6. Apparatus for converting hydrocarbon gases into motor fuel of the gasoline boiling range which comprises means for separating gas into a heavier liquid fraction and a lighter gaseous fraction, a polymerization zone, means for charging said liquid fraction to said polymerization zone, an arrester connected to said polymerization zone, a separator connected to said arrester, means for removing condensed material from said separator, means for withdrawing uncondensed gases and vapors from said separator and cooling the same, a fractionator, means for passing condensate, gases, and vapors from said cooling means to said fractionator, means for returning a portion of condensate to said arrester, means for separately withdrawing condensate and uncondensed fractions from said fractionator, means for separating the uncondensed fractions into a liquid and a gas fraction, means for commingling the last mentioned gas fraction with the first mentioned gas fraction, means for commingling the last mentioned liquid fraction with the first mentioned liquid fraction prior to charging the latter to the polymerization zone, means for contacting the commingled gases with absorption oil under super-atmospheric pressure, means for separating the oil from absorbed gases, and means for commingling the last mentioned gases with the first mentioned gases.

7. In a process of manufacturing a high flash, high anti-knock motor fuel from a gas rich in unsaturates which has been liquefied and subjected to exothermic polymerization under elevated temperatures and pressures suitable for converting said gas to hydrocarbons boiling within the gasoline boiling range and the reaction products separated into normally liquid and normally gaseous products the steps which comprise admixing gas to be charged to the polymerization zone with residual gas from the polymerization zone, contacting the commingled gas at super-atmospheric pressure with lean absorption oil, eliminating undissolved gas from the system, separating dissolved gas from the oil, fractionating the separated gas into liquid and gaseous fractions and charging the liquid fraction to the polymerization zone.

8. Method in accordance with claim 7 in which the last mentioned gaseous fraction is recirculated to the absorbing step.

9. Process in accordance with claim 7 in which the gas to be charged to the polymerization zone is first fractionated into liquid and gaseous fractions, the gaseous fraction is admixed with residual gas from the polymerization zone, the liquid fraction separated from the dissolved gases is united with the first liquid fraction prior to charging to the polymerization zone, and the gaseous fraction, separated from the dissolved gas, is recirculated to the absorbing step.

JOHN W. THROCKMORTON.